United States Patent [19]

Manzke et al.

[11] 4,206,489

[45] Jun. 3, 1980

[54] DEVICE FOR THE AUTOMATIC LOADING/UNLOADING OF AT LEAST ONE MAGNETIC HEAD IN A MAGNETIC DISC DRIVE

[75] Inventors: Klaus Manzke, Westheim; Peter Hammerschmitt, Bruehl-Rohrhof; Richard Schneider, Heidelberg-Neuenheim; Karl Uhl, Frankenthal, all of Fed. Rep. of Germany

[73] Assignee: BASF Aktiengesellschaft, Ludwigshafen, Fed. Rep. of Germany

[21] Appl. No.: 922,380

[22] Filed: Jul. 6, 1978

[30] Foreign Application Priority Data

Jul. 7, 1977 [DE] Fed. Rep. of Germany ....... 2730719

[51] Int. Cl.² .................................................. G11B 5/54
[52] U.S. Cl. ..................................................... 360/105
[58] Field of Search ................................. 360/103–105, 360/133, 135

[56] References Cited

U.S. PATENT DOCUMENTS

| | | | |
|---|---|---|---|
| 3,349,384 | 10/1967 | Kohn | 360/104 |
| 3,531,788 | 9/1970 | Brown et al. | 360/105 |
| 3,713,121 | 1/1973 | Fasano et al. | 360/103 |
| 3,733,592 | 5/1973 | Applequist | 360/103 X |
| 3,812,535 | 5/1974 | Higgins et al. | 360/103 |
| 3,931,641 | 1/1976 | Watrous | 360/103 X |
| 4,017,898 | 4/1977 | Toombs et al. | 360/104 |
| 4,120,010 | 10/1978 | Mitsuya et al. | 360/105 |

*Primary Examiner*—John H. Wolff
*Attorney, Agent, or Firm*—Keil & Witherspoon

[57] ABSTRACT

An automatic loading/unloading device for at least one magnetic head, consisting essentially of a support for the head and a spring-like member incorporating a ramp, the head support being decouplable from the spring-like member during loading and recouplable thereto upon unloading.

The loading/unloading device of the invention can be used with advantage in any type of magnetic storage system which employs rigid magnetic media and magnetic heads which can be positioned relative to said magnetic media.

7 Claims, 6 Drawing Figures

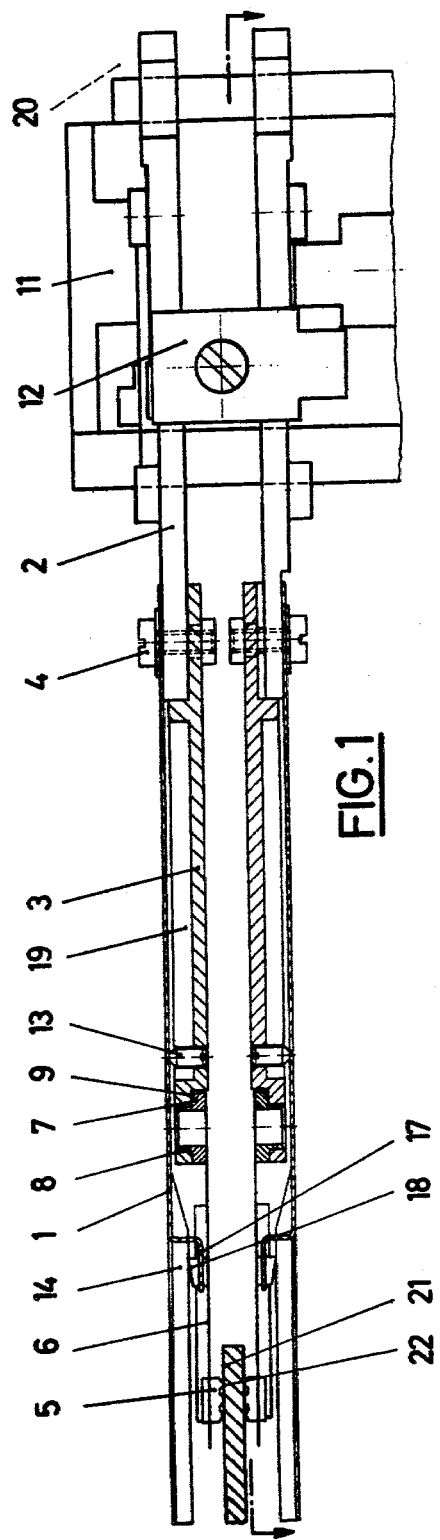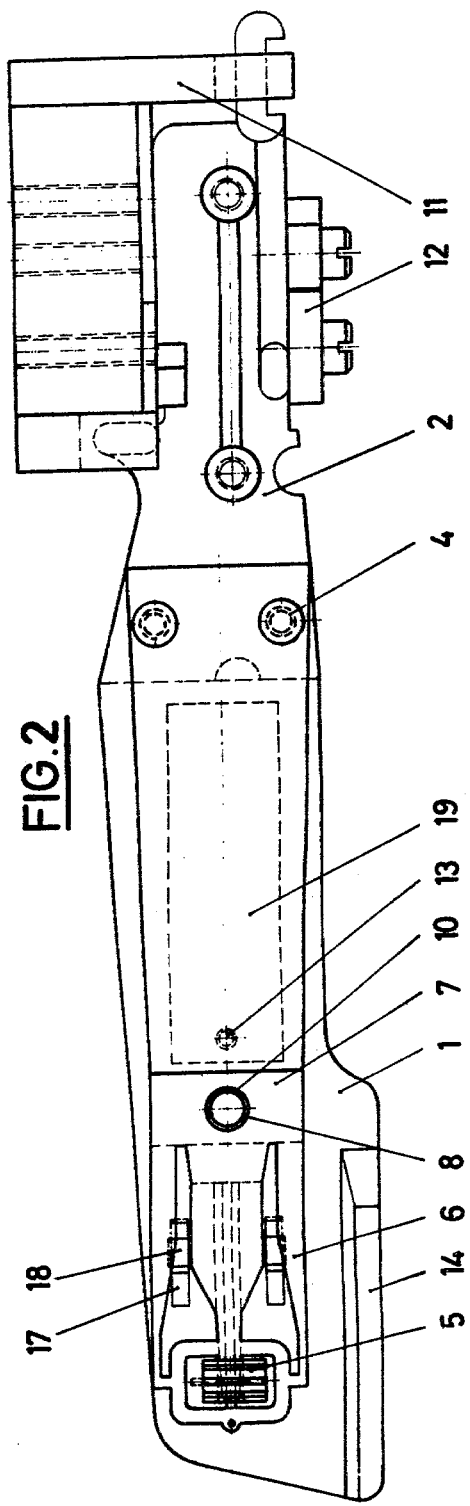

DEVICE FOR THE AUTOMATIC LOADING/UNLOADING OF AT LEAST ONE MAGNETIC HEAD IN A MAGNETIC DISC DRIVE

This invention relates to a device for the automatic loading/unloading of at least one magnetic head mounted on a spring element, the spring element being attached to a rigid support and biassed to curve away from said rigid support, which loading/unloading device includes a spring-like member which engages the spring element during head loading and unloading; a head-positioning device and cam means for positioning the head relative to the magnetic disc; and coupling means provided on the spring element for engaging the spring-like member.

A magnetic disc storage unit is known which comprises fixed, usually non-exchangeable magnetic discs and a plurality of fixed magnetic heads that are mounted on spring members and associated with said magnetic discs. As a rule, the heads are inserted by hand once only during manufacture using an auxiliary tool comprising two wires which engage two lugs provided as coupling elements on the spring member, and are then withdrawn; the heads can be unloaded in the same manner, for example in order to effect head replacement.

Furthermore, it is generally known to arrange a magnetic head on a spring member which, in turn, is attached to a rigid support, the latter forming part of a positioning device, for example a linear motor for moving the magnetic head, in order to ensure that the head bears, with a definite pressure, against a magnetic disc to be scanned. In a device of this type, loading and unloading of the head is accomplished automatically via a ramp on the spring member which co-operates with a cam device, whereby the head is lowered onto the disc surface in a predetermined position only after traversing the cam (cf., for example, U.S. Pat. No. 3,713,121).

An object of the present invention is to so modify the prior art fixed head assembly with its spring member, which forms part of a fixed disc storage unit of the type described above, that it can be used for other types of disc drive in which the magnetic heads are constantly loaded/unloaded.

This object is achieved with a device for the automatic loading/unloading of at least one magnetic head mounted on a spring element, the latter being fastened to a rigid support and pretensioned to curve away therefrom, the said device consisting essentially of a spring-like member which engages the spring element during head loading and unloading; of a head-positioning device and cam means for positioning the head relative to the magnetic disc; and of a coupling element, provided on the spring element, for engaging the spring-like member, wherein the spring-like member consists essentially of a spring, a ramp and a coupling element which co-operates with the coupling element on the spring element, the ramp and the two coupling elements being designed and arranged in such a way that, during loading (unloading), the coupling elements are automatically uncoupled (coupled) as the ramp is lowered (raised) by the cam, and the head with the spring element is moved to its operative (non-operative) position relative to the magnetic disc, in the direction of (opposite to) the bias of the spring element.

In this way, an automatic and sufficiently accurate loading/unloading operation is achieved without the need to resort to costly devices.

In a simple embodiment of the invention, the spring-like member comprises an embossed sheet-metal part having a springy portion attached to the rigid support. In this way, material is saved while reducing the inertia of the metal part and achieving sufficient rigidity.

In another embodiment of the invention, the said sheet-metal part in the non-operative condition is prestressed so as to bear on a support member whose height can be adjusted and fixed relative to the rigid support. The vertical position of the spring-like member can thus be adjusted and set.

In a further embodiment of the invention, the coupling element on the spring-like member is in the form of two, preferably punched-out, hooks. The coupling element on the spring element is advantageously in the form of two hook-shaped lugs for engaging the hooks on the spring-like member.

An embodiment of the device of the invention will now be described, by way of example, with reference to the accompanying drawings, in which FIG. 1 shows in part-sectional side elevation a loading/unloading device of the invention for two magnetic heads;

FIG. 2 is a sectional plan view taken along the arrows in FIG. 1;

Figure 3:
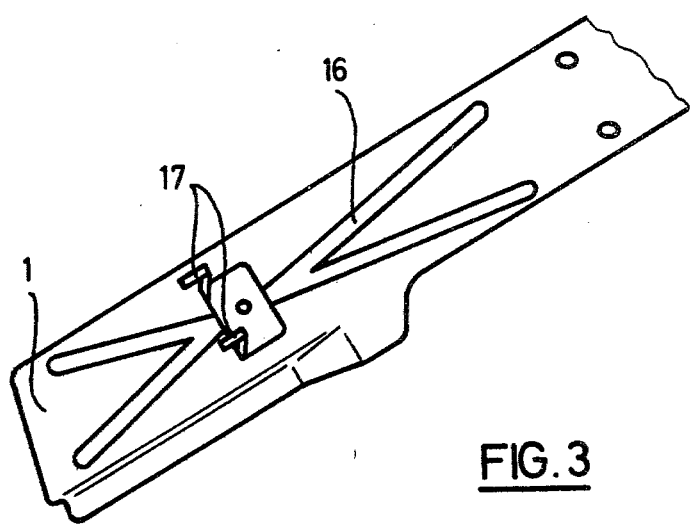
FIG. 3 is a perspective view of the spring-like member.

The head loading/unloading device illustrated in FIGS. 1 and 2 consists essentially of a clamping element 2, a rigid support 3 and a spring-like member 1. The foregoing parts are connected together by means of screws 4, their positions relative to one another thus being fixed. The magnetic head is non-detachably connected to a spring element 6, a flanged member 7 with a pin 8 being situated at its rear end. The magnetic head 5 is a commercial flying head used in a fixed disc/fixed head storage unit of the type referred to above. The spring element 6 is provided with hood-shaped lugs 18 as coupling elements. In principle, the employment of any suitable magnetic head is possible, i.e. any kind of contact head or flying head employed in disc drives may be used. The spring element 6 bearing such a head should preferably have coupling elements which match the coupling elements on the spring-like member 1. The lugs 18 (FIGS. 1, 2 and 4) or other kinds of suitably shaped and arranged eyes, recesses, etc., can be employed in conjunction with hooks 17 (FIG. 3). The coupling elements need not be in the form of two pairs of hooks and lugs, but may have any other appropriate shape.

Figure 5:
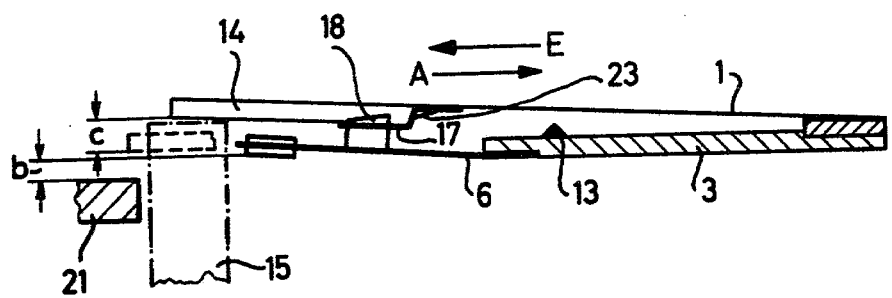
FIG. 5 is a diagrammatic partial side view of the device of the invention, showing its function during loading/unloading.

The flanged member 7 is suitably fastened to the rigid support 3, for example as shown in FIG. 1 via a shoulder 9 at the front end of the support 3, and a locating bore 10 in which pin 8 snugly fits. The rear end of the support 3 is retained by the clamping element 2 which in turn is fastened to a receiver 11 of a positioning system 20 (not shown) by clamping means 12. The spring-like member 1 is suitably prestressed so as to bear on a support element provided on the support 3, the height of which support element is adjustable; in the present embodiment the support element consists of an adjustment screw 13. Prestressing is intended to fix the head-loading and unloading positions of the spring-like member 1. Material fatigue, for example, should not be able to affect these positions, and the prestressing force is therefore set sufficiently high. The use of the adjustment screw 13 enables the vertical position of the spring-like member 1 to be set in a simple manner. The range of vertical movement of the free end of the spring-like member 1 is determined by a laterally located, embossed ramp 14, and a cam 15 (FIGS. 5 and 6) on the cam tower of the disc drive. FIG. 5 shows the spring-like member 1 in the raised position and co-operation of the cam 15 with the ramp 14. As shown in FIG. 3, the spring-like member 1 is provided with hooks 17 on its lower surface. In the embodiment illustrated here, the hooks 17 are arranged on a mounting plate which is fastened to the spring-like member 1 by suitable means, e.g. spot-welding or rivets. From the manufacturing point of view it is more advantageous, however, to stamp the hooks 17 out of the sheet metal from which the spring-like member is made, in such a way that they remain integral therewith. As will be clear from the following description, the position of the hooks 17 is determined by the position of the lugs 18 on the spring element 6.

Figure 4:
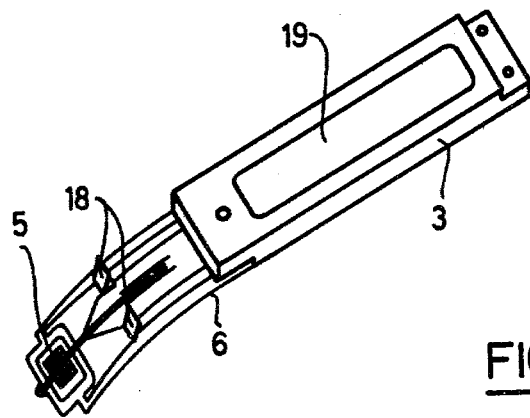
FIG. 4 is a perspective view of a magnetic head on a spring element.
Figure 6:
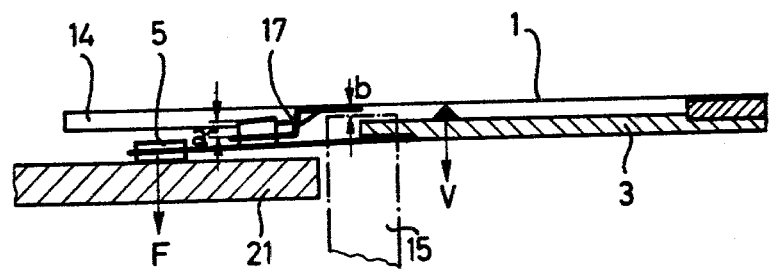
FIG. 6 is a diagrammatic partial side view of the device of FIG. 5, showing the head in its operative position on the disc.

The spring-like member 1 has a cross-shaped embossing 16 which imparts to the comparatively thin and hence low-mass piece of sheet metal sufficient rigidity and dimensional stability. As shown in FIG. 3, the embossing does not extend over the whole length of the piece of sheet metal to enable the non-embossed rear portion (f) to function as a spring. As a result of the dimensional stability in the front portion, the spring force can act without further deformation of the front portion, especially in the region of the hooks 17 and the embossed ramp 14. FIG. 4 shows the spring element 6 with the head 5, the rigid support 3 and the lugs 18. To facilitate running of the leads and connection of the head leads, not shown here, to the leads of the arm assembly, a rectangular opening 19 is provided in the rigid support 3 which, when fitted in the arm assembly, faces the spring-like member 1. As illustrated in FIGS. 1 and 2, the head arm assemblies of the loading/unloading device are advantageously arranged in mirror-image relationship and symmetrically with respect to the magnetic disc 21, only part of which is shown in FIG. 1 and FIGS. 5 and 6. The assembly consisting of the head-bearing members 1, 3 and 6, which is mounted on one side of the receiver 11 of the positioning system, is capable of being used below as well as above the disc 21.

The way in which the device functions will now be explained with reference to FIGS. 5 and 6.

The loading/unloading device, as shown for example in FIGS. 1 and 2, operates in conjunction with the positioning system 20, which advances and retracts the head(s), and with a cam tower, of which cam 15 is shown and which determines the vertical position of the head(s) during loading and unloading.

As the head is advanced across the surface of the magnetic disc (arrow E, FIG. 5), the ramp on the lower surface of the spring-like member 1 slides over the cam 15, the spring-like member 1 being raised to the position shown in FIG. 5, i.e. it is lifted off the adjustment screw 13 against the spring force (V). As a result, the hooks 17 are also raised to their upper position in which they bear against the lower surface of the lugs 18 and lift the lugs 18 together with the spring element 6 and the head 5. In this position, which occurs not only during loading (arrow E) but also during unloading (arrow A) of the head 5, the lower surface 22 (see FIG. 1) of the head 5 is at a distance b from the associated surface of the magnetic disc 21, i.e. the head is not in contact with the magnetic disc 21. In this position, the lugs 18 are urged against the hooks 17 by the loading force of the spring element 6. The spring force or bias (F) acting upon the head is illustrated in FIG. 4 by the downward curve of the spring element 6. When the spring-like member 1 with its ramp 14 rides on the cam 15, the head 5 is retracted from the disc 21 and moved to its non-operative position when the arm assembly is moved in the direction of arrow A. On the other hand, when the arm assembly is moved in the opposite direction (arrow E) to a position beyond that shown in FIG. 5, the operative position of the head 5 is reached (FIG. 6) after the ramp 14 has passed the cam 15, in which position the head 5 makes contact with the disc 21. Owing to the slope at the rear end 23 of the ramp 14, engagement of the head with the disc occurs gradually. The spring-like member 1 comes to rest upon the adjustment screw 13 of the rigid support 3 and bears thereon with the full effective bias (V) until the spring-like member 1 is moved once again to its raised position. At the instant the head 5 comes to rest on the disc 21, the spring element 6 is released by the spring-like member 1 as a result of the lugs 18 being released by the hooks 17. In this "loading position", the spring element 6 is substantially aligned with the underside of the rigid support 3. Consequently, the predetermined loading force F of the spring element 6 which acts on the head 5 and thus on the disc surface can become effective without being impeded or changed; the force typically is approximately 9 pond, with a tolerance of ±1 pond. There is such a close tolerance on this force F because head/disc contact and hence the write/read voltage is substantially affected thereby.

When it was stated above that the hooks 17 are disengaged from the lugs 18 in the loading position, this means more precisely that the hooks 17 are in contact neither with the lugs 18 themselves nor with the spring element 6 nor with any other parts. Any such contact would inevitably affect the force F. Rather a specific distance a between the top of the hook-shaped lug 18 and the horizontal portion of the hook 17 must be maintained which distance can be adjusted by turning the screw 13. Also, in connection with the above statement that the head comes to rest on the disc, it should be understood that, with the drive having been started earlier, the head is released from the hooks, and hence comes into contact with the disc surface, only for an extremely short time prior to flying. Retraction of the head takes place during rotation of the disc.

In FIG. 5, the position of the ramp 14 in the "loaded condition" of FIG. 6 is indicated by dashes, in order to give a better idea of the spatial relationships. The distance c corresponds to the range of vertical movement of the ramp 14, i.e. to the distance by which the ramp 14 is lifted by the cam 15. This distance c corresponds to the sum of the distances b (head/disc) and a (lug/hook), the distances a and b being adjustable by means of screw 13 if necessary. The distance a represents "lost motion" as far as the coupling means 17,18 are concerned.

As explained above, a device according to the invention enables trouble-free head loading/unloading operations to be carried out with simple means and great reliability.

We claim:

1. In a magnetic disc drive a device for the automatic loading and unloading of at least one magnetic head, said device comprising:
    a rigid support,
    a spring-like member,
    a spring element carrying said head,
    both said member and said element being mounted on said rigid support in parallel, vertically overlying relationship to each other and said spring element being pre-stressed in the direction toward a magnetic so as to curve away from the support in said direction,
    head positioning means for moving said rigid support inwardly and outwardly with respect to the axis of said disc,
    a ramp on said spring-like member cooperating with a relatively stationary cam, for controlling the vertical movement of said member normal to the plane of said disc in response to the inward and outward movement of said support, and
    coupling means interposed between said spring element and said spring-like member, said coupling means being of the lost-motion type such that in response to the inward movement of said support the initially engaged coupling means become automatically disengaged by means of said ramp sliding along said cam, and the spring element thus released from the spring-like member, as the head on the spring element reaches its operative position relative to the magnetic disc while the spring-like member continues its movement toward and normal to the disc under the control of said cooperating ramp and cam.

2. In a magnetic disc drive a device for the automatic loading and unloading of at least one magnetic head, said device comprising:
    a rigid support,
    a spring-like member,
    a spring element carrying said head,
    both said member and said element being mounted on said rigid support in parallel, vertically overlying relationship to each other and said spring element being pre-stressed in the direction toward a magnetic so as to curve away from the support in said direction,
    head positioning means for moving said rigid support inwardly and outwardly with respect to the axis of said disc,
    a ramp on said spring-like member cooperating with a relatively stationary cam, for controlling the vertical movement of said member normal to the plane of said disc in response to the inward and outward movement of said support, and
    coupling means interposed between said spring element and said spring-like member, said coupling means being of the lost-motion type such that in response to the outward movement of said support the initially disengaged coupling means become automatically engaged by means of said ramp sliding along said cam and the spring element coupled for movement together with the spring-like member as said member, upon the head on the spring element leaving its operative position relative to the magnetic disc, continues its movement away from and normal to the disc under the control of said cooperating ramp and cam.

3. In a magnetic disc drive a device as claimed in claims 1 or 2, wherein said spring-like member is pre-stressed so as to bear, in its normal position assumed thereby with said ramp out of engagement with said cam, against an abutment member on said rigid support.

4. In a magnetic disc drive a device as claimed in claim 3, wherein said abutment member is in the form of a screw in said rigid support for adjusting and fixing the spacing of said spring-like member relatively to said support.

5. In a magnetic disc drive a device as claimed in claims 1 or 2, wherein said spring-like member is in the form of an embossed sheet-metal part having a spring portion attached to the rigid support.

6. In a magnetic disc drive a device as claimed in claim 1 or 2, wherein said coupling means comprise two hooks on the spring-like member and two cooperating hook-shaped lugs on the spring element.

7. In a magnetic disc drive a device as claimed in claim 6, wherein said hooks are in the form of punched-out portions of said spring-like member.

* * * * *

UNITED STATES PATENT AND TRADEMARK OFFICE
CERTIFICATE OF CORRECTION

PATENT NO. :   4,206,489
DATED      :   June 3, 1980
INVENTOR(S) :  MANZKE ET AL It is certified that error appears in the above-identified patent and that said Letters Patent are hereby corrected as shown below:

Col. 5 (Claim 1) line 14,

" a magnetic" should read --- a magnetic disc ---.

Col. 6, (Claim 2), line 1,

" a magnetic" should read --- a magnetic disc ---.

Signed and Sealed this

Nineteenth Day of August 1980

[SEAL]

Attest:

SIDNEY A. DIAMOND

*Attesting Officer*　　　*Commissioner of Patents and Trademarks*